Patented Oct. 6, 1953

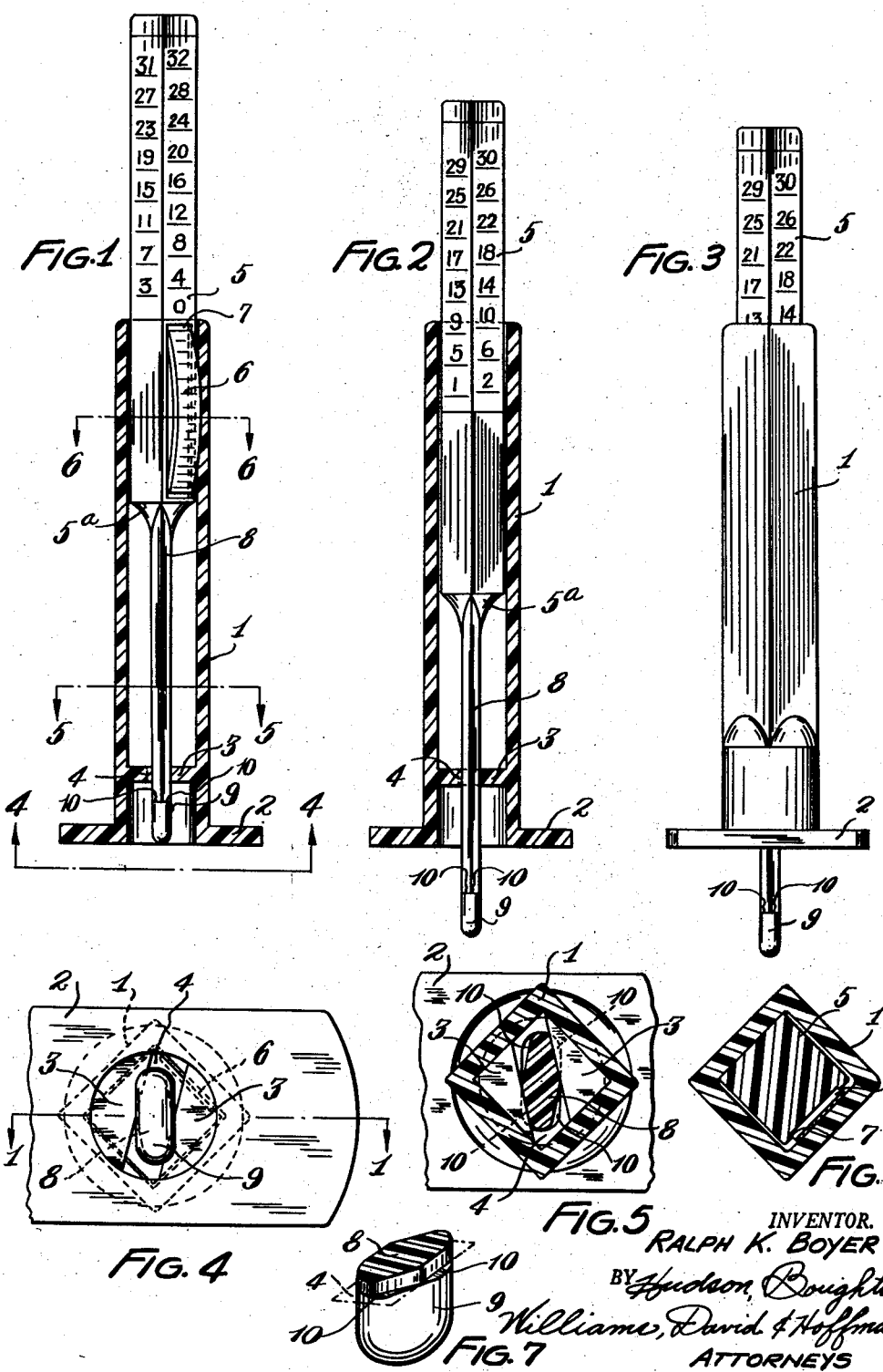

2,654,156

UNITED STATES PATENT OFFICE 2,654,156

TIRE TREAD GAUGE

Ralph K. Boyer, Cleveland, Ohio, assignor to The Dill Manufacturing Company, Cleveland, Ohio, a corporation of Ohio Application February 29, 1952, Serial No. 274,169

3 Claims. (Cl. 33—172)

The invention herein described relates to a gauge which may be applied to the tread of a pneumatic tire casing, which, as is well known, usually is provided with spaced projections or ridges and which case when applied to the adjacent ridges or projections, will give a measurement which will be indicative of the amount of tread rubber available for the use.

The invention herein described provides a device which is simple in construction and of such size that it may be carried in the pocket of the person using the gauge and the construction is such as to limit itself readily to being made of a plastic composition which enables its production at a low cost.

Referring to the drawings,

Fig. 1 is an elevation with positions and section of the gauge.

Fig. 2 is an elevation with positions and section of the gauge and showing the movable portion of the gauge in an adjusted position.

Fig. 3 is an elevation of the gauge.

Fig. 4 is a bottom plan view looking in the direction of the line 4—4 in Fig. 1.

Fig. 5 is a section upon the line 5—5 of Fig. 1.

Fig. 6 is a section upon the line 6—6 of Fig. 1.

Fig. 7 is a perspective view of a part of the gauge.

The drawing 1 indicates a casing, which casing is open at the top and the bottom, the lower part of the casing being provided with a foot 2 which is longer than its width, the size of which foot is chosen so that it may engage the tops of adjacent ribs or projections upon the tire casing to permit the operation of the movable member of the gauge in determining the height of the projections or ribs in question with respect to the body of the casing.

Within the casing and adjacent the lower portion, there is a partition 3. This partition has a slot formed therein which is indicated at 4 in Fig. 4 and the axis of the slot is at an angle with respect to the transverse axis of the partition 3. The purpose of this construction will be subsequently described.

Telescopingly mounted within the casing 1 is the indicator member 5. This indicator member is of such a length that it never entirely telescopes within the casing 1. In other words, there is always a portion of the member 5 which extends beyond the casing 1.

The member 5 is mounted within the casing 1 so as to be non-rotatable with respect to the casing which is preferably obtained, although not necessarily, by making the casing square in section, as will be clearly seen from Figs. 5 and 6 and also making the member 5 of similar contour.

In order to hold the member 5 from freely moving within the case 1, there is provided a flat bowed spring 6 which engages in a slight indentation in a portion of the member 5 as indicated at 7 in Fig. 1. This bowed spring engages with a wall of the casing 1 in a frictional manner and thereby holds the member 5 at any adjusted position with respect to the casing.

The member 8 is provided with an extension which is an elongated rather flat member and this member 8 has as a part thereof a head 9 which is formed to have portions slightly wider than the member 8 and so provides shoulders two of which are indicated at 10 in Fig. 7, there being similar shoulders upon the opposite side of head 9. These shoulders perform a function to which reference will later be made.

The member 8 is formed of material which is, at least to a slight extent, flexible in the sense that it may be subjected to a slight torsional twisting and thereafter return to its initial condition.

The purpose of the provision of the angularly disposed slot 4, the extension 8, and the head 9, is to effect an easy mode of assembly. Assuming that the member 5 and its extension 8 are to be assembled with respect to the casing 1, the member 5 is moved into the casing, the spring 6 being maintained in its slot 7 by the operator, at least until a portion of the spring has moved withint he casing 1.

As the head 9 moves toward the slot, the rounded formation upon the lower portion of the head 9, as indicated clearly in Figs. 2 and 3, will engage with the slot 4 and produce a slight twisting action with respect to the head 9 and extension 8 so that the head can slip through the slot 4 and the said parts immediately return to initial position which is shown in Fig. 4 and also indicated in Fig. 5 so that one or more of the shoulders 10 on the head member 9 will be below the partition 3 and when extension 8 is in its untorsioned position one or more of the shoulders will be in position to engage with the underside of the partition 3 so that movement of the member 5 will be limited so far as its outward movement is concerned.

Obviously the inward movement of the member 5 is stopped by engagement of the lower portion of the member 5 as indicated at 5a with the upper portion of the partition 3.

The outer portion of the member 5 is provided with indicia markings which are readable when a given indicia line coincides with the upper end of the member 1.

In use the member 5 is drawn outwardly so that the head 9 is substantially in the position shown in Fig. 1 of the drawing. The extension or foot member 2 is applied to adjacent projections or ribs upon the surface of the casing of the tire and the member 5 depressed until the head 9 strikes upon the position of the tire which is at the base of the projections or ribs. The result is read from the member 5 at the upper end of the casing 1 by observing the indicia line of the member 5, which is flush with the end of the casing 1, thus giving a measurement which is indicative of the amount of rubber available for continued use of the tire casing.

As before stated the structure of the gauge is such as to readily enable the gauge to be made of a suitable plastic such for instance as nylon, employing suitable molding procedures.

Changes in construction may be made within the scope of the appended claims.

Having thus described my invention, I claim:

1. A tire tread gauge comprising an elongated casing, said casing having a foot at one end thereof of a breadth sufficient to span adjacent protuberances on a tire tread, said casing also having a transverse partition therein adjacent but spaced from the lower end of the casing, which partition is provided with a slot, a movable member partially within the casing and extending beyond the casing at one end thereof, the extending portion being provided with graduated markings, said movable member having a torsionally flexible extending portion which normally extends through the slot in the aforesaid partition in the assembled gauge, said extending portion having a head thereon of such size that it may be forced through the slot in the partition due to the torsional flexibility of said extending portion, in assembling the gauge, said head thereafter returning to its non-torsional position to engage the underside of the said partition to limit the outward movement of the said movable member.

2. A tire tread gauge comprising an elongated casing, said casing having a foot at one end thereof of a breadth sufficient to span adjacent protuberances on a tire tread, said casing also having a transverse partition therein, which partition is provided with a slot, a movable member partially within the casing and extending beyond the casing at one end thereof, the extending portion being provided with graduated markings, said movable member having an extending thin slightly flexible portion which normally extends through the slot in the before-mentioned partition of the casing, said extending portion having a head thereon at the inner end of the said flexible portion of a size slightly less than the size of the slot, the long axis of the head being at a slight angle with respect to the long axis of the slot in the partition whereby in assembling the said movable member with respect to the casing the head upon the flexible portion of said movable member will engage the slot in the partition of the casing, and be twisted as the head is pushed through the slot, and subsequently return to normal position, whereby said head provides a stop to normally prevent separation of the casing and the said movable member.

3. A tire tread gauge comprising an elongated hollow casing, said casing being provided with a transverse foot at an end thereof, which foot is of a breadth sufficient to span adjacent protuberances on a tire tread, said casing having a transverse partition therein adjacent but spaced from the lower end of the casing, said partition being provided with an oblong slot, a movable member having a portion thereof within the casing and a portion thereof extending beyond the casing at the open end thereof, the said movable member being slidably mounted within the casing, the extending portion before mentioned being provided with graduated markings, the portion of said movable member within the casing having a bladelike extension which is torsionally resilient, the lower end of said extension being provided with a flattened head of slightly less dimension than the aforesaid slot, the said head having shoulders thereon adjacent the place where the head is connected with the bladelike member, the side portions of the said head being parallel and extending at an angle with respect to the long axis of the slot in the partition when the bladelike member is initially inserted into the casing, the said flat head upon the blade being adapted to be forced through the said slot effected by virtue of a torsional twist of the bladelike member until the flat head has passed through the slot and the head portion is below the partition in the casing and the torsional strain on the bladelike member is relieved whereby the shoulder portion on the flat head will engage the underside of the partition in the casing to prevent withdrawal of said graduated member from the casing.

RALPH K. BOYER.

References Cited in the file of this patent

UNITED STATES PATENTS

| Number | Name | Date |
|---|---|---|
| 379,423 | Spencer | Mar. 13, 1808 |
| 763,076 | Spalding | June 21, 1904 |
| 1,248,340 | Kinney | Nov. 27, 1917 |
| 1,459,896 | John | June 26, 1923 |
| 2,021,259 | Magnuson | Nov. 19, 1935 |
| 2,486,286 | Irving | Oct. 25, 1949 |
| 2,514,794 | Prince | July 11, 1950 |